Patented Oct. 6, 1931

1,825,875

UNITED STATES PATENT OFFICE

MAX ALBERT KUNZ, OF MANNHEIM, AND KARL KOEBERLE, OF LUGWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS

No Drawing.  Application filed March 15, 1929.  Serial No. 347,445.

The present invention relates to new vat dyestuffs.

We have found that valuable dyestuffs dyeing the vegetable fibre from the vat grey shades of excellent fastness and great strength are obtained by condensing 1 molecular proportion of a 3.4.8.9-dibenzopyrene-5.10-quinone containing from 1 to 4 halogen atoms with from 1 to 4 molecular proportions of 1-amino-4-benzoylamino anthraquinone. Since in the said condensation halogen hydride is split off, the resulting products correspond to the general formula

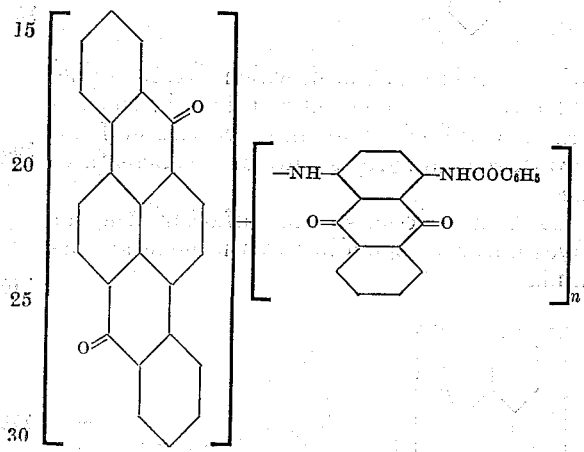

wherein $n$ is 1, 2, 3 or 4. The same products can also be obtained by employing 1.4-diamino anthraquinone in such proportions as to combine only one amino group thereof with the dibenzopyrenequinone molecule and then benzoylating the remaining amino group of the diamino anthraquinone radical. The dyestuffs obtained according to the present invention are grey to black powders dissolving in concentrated sulphuric acid with red to blue red color and dyeing cotton from a brown red vat grey shades of excellent fastness. Particularly valuable are those products which are obtained from the dihalogen-dibenzopyrene quinones because these are particularly fast and have a particularly great tinctorial strength, and those products which are derived from the dibromo-3.4.8.9-dibenzopyrene-5.10-quinone obtainable by dissolving 33 parts of pure 3.4.8.9-dibenzopyrene-5.10-quinone in 300 parts of chlorosulphonic acid, adding from 1.65 to 2.3 parts of iodine and then at room temperature 20 parts of bromine, and heating to from 70° to 80° C. until the bulk of the bromine has been taken up (the constitution of this product is probably as follows),

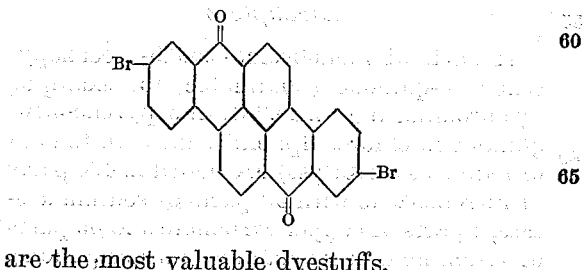

are the most valuable dyestuffs.

When the new products are treated with acid condensing agents, such as aluminium chloride or a mixture of aluminium chloride and sodium chloride, formation of a carbazol nucleus takes place and new dyestuffs are obtained which are only difficultly soluble in concentrated sulphuric acid giving green blue solutions and which dye the vegetable fibre very fast brown shades.

The following examples will further illustrate how our present invention may be carried out in practice, but the invention is not limited to these examples. The parts are by weight.

*Example 1.*

98 parts of the dibromo-3.4.8.9-dibenzopyrene-5.10-quinone specifically referred to above are boiled in 1200 parts of naphthalene with 100 parts of calcined sodium carbonate, 10 parts of copper oxide and 141 parts of 1-amino-4-benzoylamino-anthraquinone, while stirring, until the reaction product is practically free from bromine. The product may be worked up by diluting the mixture, after cooling it to about 130° to 140° C., with 1500 parts of monochlorobenzene, filtering by suction and treating the residue with steam in order to remove the last traces of solvent, or by distilling off the solvent, if desired with the aid of a vacuum or of steam or both. The resulting dyestuff which is obtained with a good yield and in a state of high purity, is a bluish grey powder dissolving to a bluish red solution in concentrated sulphuric acid and dyeing cotton from a brown red vat strong bluish grey shades of excellent fastness and in particular absolute fastness to boiling with soap or soda solution, to chlorine and to bucking.

Instead of the aforesaid dibromo-dibenzopyrenequinone, an equivalent amount of the corresponding dichloro- or diiodo-derivative may be used. The naphthalene can be replaced by other solvents or suspension media, for example by nitrobenzene, but the reaction may also be carried out in the absence of such agents. Instead of sodium carbonate, other salts of the alkali metals or alkaline earth metals or the oxides of the last group of metals may be used as agents binding acids, and the copper oxide may be replaced by metallic copper or by other copper compounds.

*Example 2*

41 parts of monobromo-3.4.8.9-dibenzopyrene-5.10-quinone (obtainable, for example, by brominating 3.4.8.9-dibenzopyrene-5.10-quinone in chlorosulphonic acid with the aid of iodine as a catalyst) are boiled in 400 parts of nitrobenzene with 30 parts of sodium acetate, 4 parts of copper carbonate and 35 parts of 1-amino-4-benzoylamino anthraquinone, while stirring, until the reaction product is practically free from bromine. The product is worked up as described in Example 1. The resulting dyestuff is a black powder dissolving to a red solution in concentrated sulphuric acid and dyes cotton from a brown red vat grey shades of excellent fastness. Instead of the aforesaid monobromo-dibenzopyrenequinone, an equivalent amount of other monohalogen-3.4.8.9-dibenzopyrene-5.10-quinones may be used, and the process may be carried out in naphthalene instead of in nitrobenzene, or also in the absence of solvents or suspension media.

*Example 3*

49 parts of the dibromo-3.4.8.9-dibenzopyrene-5.10-quinone used according to Example 1 are boiled in 500 parts of naphthalene, while stirring, with 50 parts of 1.4-diamino-anthraquinone, 50 parts of calcined sodium carbonate and 5 parts of copper carbonate, until the reaction product is practically free from bromine. The product may be worked up as described in Example 1 and then benzoylated by one of the usual methods. Or the reaction mixture is allowed to cool to about 100° C. whereupon 10 parts of collidine and 25 parts of benzoyl chloride are added and the mixture is heated to from 180° to 200° C. until a sample gives a dyeing on cotton, which is completely fast to chlorine. The product is identical with that described in Example 1.

The product described in Example 2 can be prepared in an analogous manner.

What we claim is:

1. As new articles of manufacture, the vat dyestuffs corresponding to the general formula

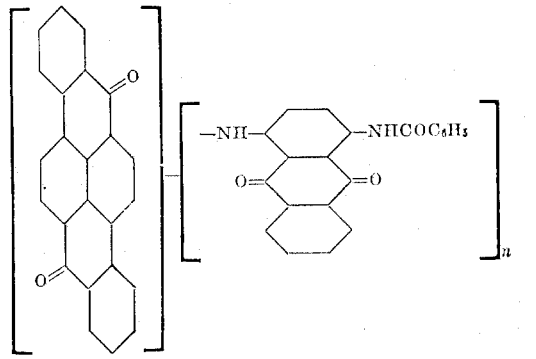

wherein $n$ is 1, 2, 3 or 4, which dyestuffs dissolve to red to blue red solutions in concentrated sulphuric acid and dye cotton from brown red vats grey shades of excellent fastness.

2. As new articles of manufacture, the vat dyestuffs corresponding to the general formula

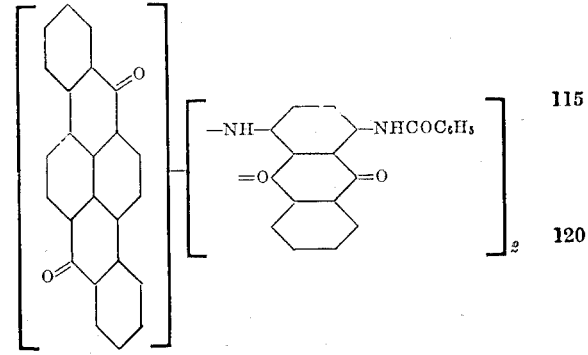

which dyestuffs are bluish grey to bluish black powders dissolving to blue red solutions in concentrated sulphuric acid and dye cotton from brown red vats strong bluish grey shades of excellent fastness.

3. As a new article of manufacture, the vat dyestuff corresponding to the formula

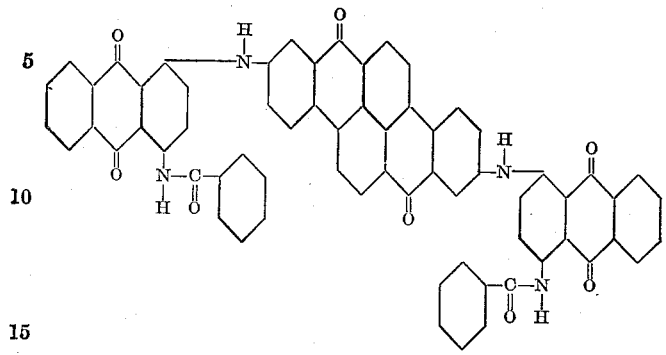

which dyestuff is a bluish grey powder dissolving to a blue red solution in concentrated sulphuric acid, dyes cotton from a brown red vat strong bluish grey shades of excellent fastness, and which is obtainable by condensing two molecular proportions of 1-amino-4-benzoylamino-anthraquinone with one molecular proportion of the dibromo-3.4.8.9-dibenzopyrene-5.10-quinone obtainable by dissolving 33 parts of pure 3.4.8.9-dibenzopyrene-5.10-quinone in 300 parts of chlorosulphonic acid, adding from 1.65 to 2.3 parts of iodine and then at room temperature 20 parts of bromine, and heating to from 70° to 80° C. until the bulk of the bromine has been taken up.

4. The process of producing new vat dyestuffs which comprises condensing one molecular proportion of a 3.4.8.9-dibenzopyrene-5.10-quinone containing from 1 to 4 halogen atoms with as many molecular proportions of 1.4-diamino anthraquinone, as halogen atoms are present in the dibenzopyrene-quinone molecule, and benzoylating the resulting product.

5. The process of producing new vat dyestuffs which comprises condensing one molecular proportion of dihalogen-3.4.8.9-dibenzopyrene-5.10-quinone with 2 molecular proportions of 1.4-diaminoanthraquinone, and benzoylating the resulting product.

In testimony whereof we have hereunto set our hands.

MAX ALBERT KUNZ.
KARL KOEBERLE.